(12) United States Patent
Higashiyama et al.

(10) Patent No.: US 7,024,623 B2
(45) Date of Patent: Apr. 4, 2006

(54) METHOD AND SYSTEM FOR PLACING AN INSERTION POINT IN AN ELECTRONIC DOCUMENT

(75) Inventors: Nobuya Higashiyama, Issaquah, WA (US); Rahul Sonnad, Boston, MA (US); Koji Ishii, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/098,366

(22) Filed: Jun. 17, 1998

(65) Prior Publication Data
US 2002/0032705 A1 Mar. 14, 2002

(51) Int. Cl.
*G06F 15/00* (2006.01)
*G06F 17/00* (2006.01)

(52) U.S. Cl. .................. 715/530; 715/512; 715/519; 717/112

(58) Field of Classification Search ............. 707/519, 707/530, 517, 540, 512, 500, 100; 358/1.18, 358/1.12; 706/11; 704/9; 715/530, 517, 715/512, 519; 717/112
See application file for complete search history.

(56) References Cited

U.S. PATENT DOCUMENTS

| | | | | |
|---|---|---|---|---|
| 3,654,611 A | * | 4/1972 | Bluethman et al. | 358/1.18 |
| 5,548,700 A | * | 8/1996 | Bagley et al. | 707/540 |
| 5,627,948 A | * | 5/1997 | Fukunaga | 358/1.12 |
| 5,754,737 A | * | 5/1998 | Gipson | 706/11 |
| 5,778,402 A | * | 7/1998 | Gipson | 707/530 |
| 5,813,019 A | * | 9/1998 | Van De Vanter | 707/512 |
| 5,832,528 A | * | 11/1998 | Kwatinetz et al. | 707/500 |
| 5,857,212 A | * | 1/1999 | Van De Vanter | 707/519 |
| 6,016,467 A | * | 1/2000 | Newsted et al. | 704/9 |
| 6,092,068 A | * | 7/2000 | Dinkelacker | 707/100 |

OTHER PUBLICATIONS

Wagner, Annette et al., Drag me, drop me, treat me like an object, ACM Conference on Human Factors and Computing Systems, pp.525-530.*

WordPerfect Version 6.1 For Windows, released Apr. 15, 1996 by Corel Corporation, screenshots from application pp. 1-9.*

WordPerfect Version 6.1 For Windows (hereinafter WordPerfect), released Apr. 15, 1996 by Corel Corporation, screenshots from application, pp. 1-10.*

(Continued)

Primary Examiner—William Bashore
(74) Attorney, Agent, or Firm—Merchant & Gould PC

(57) ABSTRACT

A method for placing an insertion point in an electronic document in an electronic system for creating and editing an electronic document. Context information regarding a location of a cursor in the electronic document is collected. A coinciding rule is selected from one of a number of rules based on the collected context information. In response to selecting a coinciding rule, the cursor is changed to indicate an anticipated location of the insertion point and the associated formatting rules to be applied. A determination is made whether an indication has been received to place the insertion point in the electronic document, and, if so, then formatting is performed to place the insertion point in the electronic document.

21 Claims, 4 Drawing Sheets

OTHER PUBLICATIONS

Multi-Edit Text Editor Version 8.0, Apr. 29, 1998 by American Cybernetics, application screenshots pp. 1-8.*

Multi-Edit Text Editor Version 8.0, Apr. 29, 1998 by American Cybernetics, additional application screenshots pp. 9-10.*

Nobu, H., Two-Cursor System (Both Hands User Interface), downloaded from <www.ip.com>, ID: IPCOM00011-4845D, IBM TDB, Feb. 1, 1995, pp. 151-154.*

Baker, BA, Automatic Adjustment to Placement of Text in Document, downloaded from <www.ip.com>, ID: IPCOM000063051D, IBM TDB, Feb. 1, 1985, p. 5109.*

WordPerfect Version 6.1 For Windows, released Apr. 15, 1996 by Corel Corporation, screenshots from application pp. 1-9.

* cited by examiner

METHOD AND SYSTEM FOR PLACING AN INSERTION POINT IN AN ELECTRONIC DOCUMENT

TECHNICAL FILED

This invention relates to word processing program modules. More particularly, this invention relates to a method and system for placing an insertion point in an electronic document.

BACKGROUND OF THE INVENTION

Using modem word processing program modules to create and edit electronic files, or electronic documents, is often convenient and efficient. Word processing program modules typically display an insertion point, such as a blinking short vertical line to indicate the point at which elements may be added to an electronic document. Text, tables, and other elements are typically added to an electronic document beginning at an insertion point. However, the usual method for positioning an insertion point in an electronic document is sometimes counterintuitive to users.

Typically, using a U.S. word processing program module, an insertion point is vertically positioned by using the enter key to add "paragraph marks" and horizontally positioned by adding tabs or spaces on a line. This typical method is based upon the typewriter concept of the use of tabs and carriage returns to move down and across a typewritten page. However, many users, including Asian users, are unfamiliar with typewriters. Thus, the typewriter metaphor for positioning an insertion point in an electronic document is counterintuitive to many users.

Some Asian versions of word processing program modules compose documents with spaces placed throughout the document and paragraph marks (¶) placed throughout the document. Because the document is composed of spaces, which are automatically created when a document is created, a user may position an insertion point anywhere within a document by clicking a mouse button and immediately begin typing in text at the cursor location. In contrast, in most program modules, each page must be created and then paragraph marks added to the pages of the document to vertically position the insertion point.

A drawback to the word processing program modules that are automatically filled with spaces is that there is no centering or alignment provided with the insertion point. Thus, the user cannot automatically align their text by simply inserting the cursor in a particular location. Another drawback of these word processing program modules that are automatically filled with spaces is that the electronic documents are difficult to edit because the document is multiple pages composed of text and spaces. Thus, any new typed entry effects placement of all text after the typed entry and may cause movement and shifting of text that is not desired by the user.

Some word processing program modules solve the problem of centering and alignment by allowing only three positioning areas: left aligned, centered, and right aligned. However, because these program modules do not examine the context of the cursor before adding the insertion point, these program modules have the drawback that a user is not able to position the insertion point exactly where desired if it is not at these three locations in a line. For example, a user may wish to place an insertion point very close to the right side of the document, but the user may not wish to have the insertion point right-aligned. These program modules with three position areas do not allow precise positioning of the insertion point.

Still other word processing program modules use fixed width tabs to position the insertion point rather than using left, right, and center alignment. However, these word processing program modules still suffer from several drawbacks. First, the granularity of these program modules is limited because the tabs all have fixed widths. In other words, the insertion point may only be placed at tab stops even if the user desires a different positioning. Another drawback is that text below and to the right of the insertion point may be moved down the page when an insertion is made even though that may not be the desire of the user.

There is a need for an intuitive method and system for positioning an insertion point in an electronic document that examines existing formatting, existing text, and context to determine the necessary formatting that needs to be applied and insertion point location. There is a further need for a method and system for positioning an insertion point that provides an indication to the user of possible insertion point placement should the user double-click the mouse button. There is still a further need for a method and system for positioning an insertion point that does not move text below the insertion point counterintuitively to the user's desires. There is still a further need for a method and system for positioning an insertion point that changes the attributes of objects in a document so that the cursor is positioned correctly, such as by wrapping text on an image or table.

SUMMARY OF THE INVENTION

The present invention satisfies the above described needs by allowing an insertion point to be positioned at various points within an electronic document simply by double-clicking a button on a mouse. Generally described, the present invention provides a computer-implemented method for placing an insertion point in an electronic document. The present invention determines the location that the user is double-clicking on and determines the most likely position that the user wants to place the insertion point based on the context information of the cursor location. The present invention then makes any necessary formatting (and text and object attribute) adjustments in the electronic document to position the insertion point in the electronic document.

In one aspect, context information regarding a location of a cursor in the electronic document is collected. A coinciding rule is selected, based on the collected context information, from one of a number of rules. In response to selecting a coinciding rule, the cursor is changed to indicate the anticipated formatting rule to be applied. A determination is made whether an indication has been received to place the insertion point in the electronic document, and, if so, then formatting is performed to place the insertion point in the electronic document.

In one aspect, the step of determining whether an indication has been received to place the insertion point in the electronic document may be accomplished by determining whether a button on a mouse has been double-clicked.

In another aspect, the invention may include the step of adding and deleting properties from the electronic document to perform formatting to place the insertion point in the electronic document.

In one aspect, the step of collecting context information regarding a location of a cursor in the electronic document may be performed in response to a change in the location of the cursor.

In still another aspect, each one of the rules may be associated with a trigger, and the step of selecting a coinciding rule from one of a number of rules based on the collected context information is accomplished by matching the collected context information with one of the triggers and selecting the rule associated with the matched trigger as the coinciding rule.

In yet another aspect, each one of the rules may be associated with a sequence of formatting steps. The step of performing formatting to place the insertion point in the electronic document may be accomplished by performing the sequence of formatting steps associated with the coinciding rule.

In still another aspect, the present invention is a method for displaying a special cursor indicating the formatting which will take place when the user double-clicks the mouse button. Context information regarding a location of the cursor is collected and the collected context information is applied to a database of rules to determine whether the collected context information coincides with one of the rules. If so, then it is determined which one of a number of cursors is associated with the coinciding rule, and the associated cursor is displayed in order to signify to the user what formatting will be applied. The associated cursor typically indicates the anticipated location of an insertion point in the electronic document. The cursors may include a left alignment icon, a right alignment icon, a center alignment icon, and a text wrap icon.

In still another aspect, the present invention is a method for adjusting the location of an insertion point in an electronic file to match the location of a cursor. Context information regarding a location of a cursor in the electronic file is collected and applied to a database of rules to determine whether the collected context information coincides with one of the rules. If so, then the location of the insertion point is adjusted based upon the coinciding rule. A determination is made whether the location of the insertion point matches the location of the cursor, and, if not, then context information is collected again and the steps described above are repeated.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
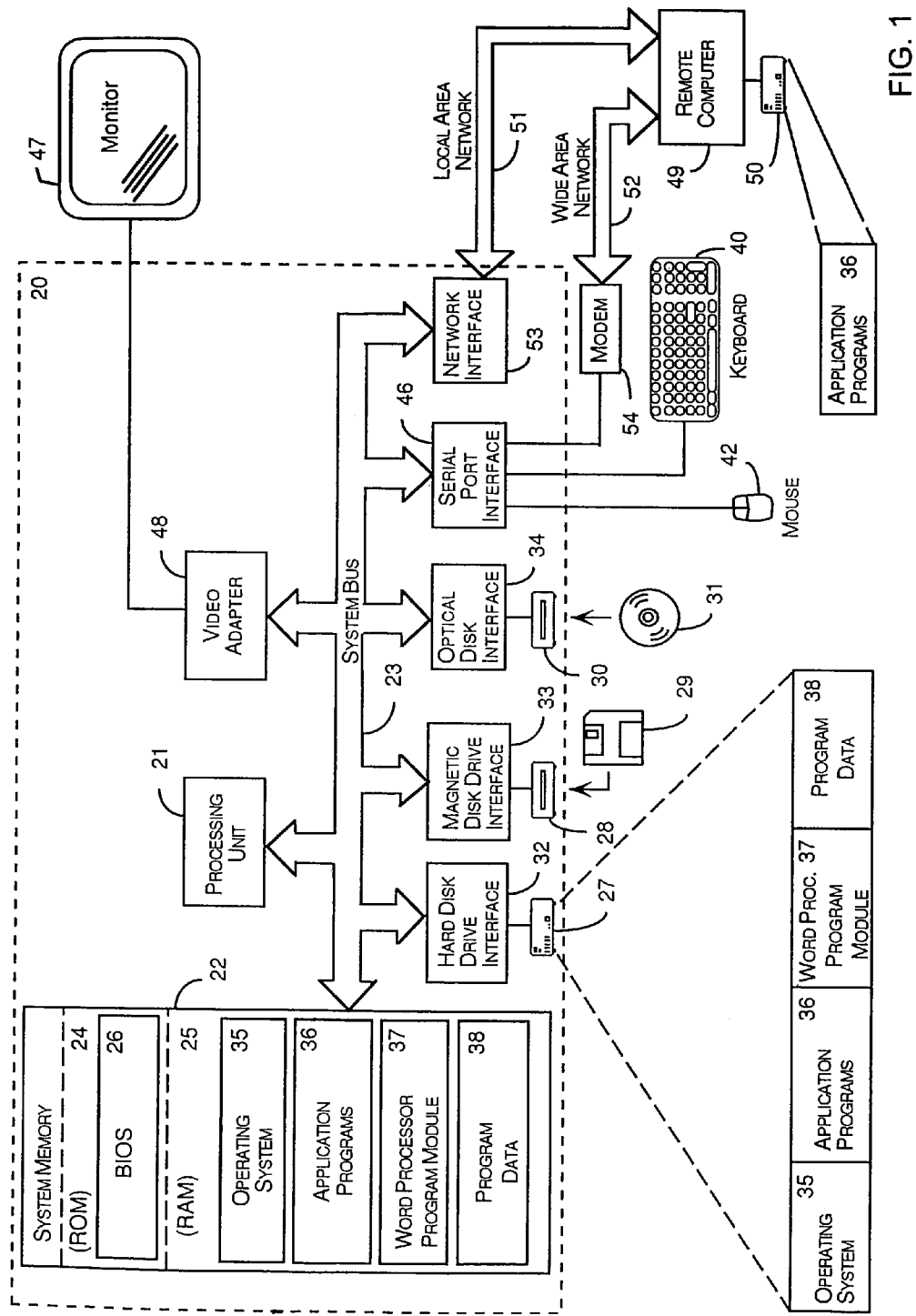
FIG. 1 is a block diagram of a computer that provides the exemplary operating environment for the present invention.

The present invention is directed toward a method and system for placing, or positioning, an insertion point in an electronic document. In one embodiment, the invention is incorporated into a preferred word processing application program entitled "WORD 9.0", marketed by Microsoft Corporation of Redmond, Wash. Briefly described, the preferred application program allows a user to create and edit electronic documents by entering characters, symbols, graphical objects, and commands. "WORD 9.0" also includes a Click and Type feature.

The Click and Type feature of the preferred application program allows a user to place an insertion point at various points within an electronic document without having to manually add spaces, tabs or carriage returns to the document. Generally described, the location that the user is clicking on with a cursor is determined. The most likely position that the user wants to place the insertion point and text and object formatting attributes are determined based on the context information regarding the cursor location. Any necessary formatting adjustments are made in the electronic document to place the insertion point at the cursor location.

The Click and Type feature provides an intuitive method for placing an insertion point before entering text or other elements into a document. The Click and Type feature eliminates the limits on insertion point placement, which are imposed by the location of paragraph marks and the end of document (EOD) marker. The Click and Type feature will also allow easy positioning of tables, graphics, and text by providing automatic application, or formatting, of tabs, indents, alignment and other formatting constructs. Oftentimes, in the prior art, a user could use the mouse to position the insertion point anywhere text exists in a document, but the user was constrained by the boundaries of the existing text, including paragraph marks.

Thus, using the Click and Type feature, a user may place the insertion point, using the mouse, in the middle of a blank page without having to hit the Enter key several times to insert paragraph marks. Likewise, a user may place the insertion point on the right side of a page by double-clicking on the right side of a page. The user does not need to enter spaces, tabs, or right justification. Therefore, the Click and Type feature eliminates insertion point placement limitations, which had been previously limited vertically by the need for paragraph marks and which had been limited horizontally by the need for other characters or spaces.

Some of the advantages of the Click and Type feature may be better understood through a brief description of an example. Suppose a user wishes to create a title page with the title of the document centered towards the top of a page and the author and date in the bottom right corner of the page. Using prior art methods, a user may have to perform the following steps:

1. hit the Enter key several times to add paragraph marks and move vertically down the title page;

2. change the paragraph format to "Centered";

3. type the title of the document;

4. hit the Enter key several more times to add more paragraph marks and move vertically down the title page;

5. change the paragraph format to "Right Jusitified"; and 6. type the author's name and date. However, using the Click and Type feature, the same title page may be created without having to hit the Enter key and without having to manually set the justification. Thus, the steps would be:

1. double-click in center of page, where title is desired;

2. type the title of the document;

3. double-click in bottom right side of page: and 4. type the author's name and date.

Having briefly described an embodiment of the present invention, an exemplary operating environment for the present invention is described below.

Exemplary Operating Environment

Referring now to the drawings, in which like numerals represent like elements throughout the several figures, aspects of the present invention and the exemplary operating environment will be described.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a word processor program module 37, program data 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Placing an Insertion Point in a Document

Briefly described, the present invention provides a method and system for positioning an insertion point in an electronic document. It should be understood that the insertion point is typically a flashing vertical line used to indicate where elements such as text will be inserted into a document. In most prior art program modules, the insertion point is positioned by adding paragraph marks to the document to vertically position the insertion point and by adding tabs or spaces to horizontally position the insertion point. This process is time-consuming and counterintuitive to many users. Thus, in prior art program modules, to enter text ten lines down on a page, the user must enter ten paragraph marks (¶) and then begin entering text. Using the present invention, as further described below, the user would simply move the cursor, using the mouse, ten lines down the first page and double-click the mouse button to position the insertion point. Thus, the user does not have to enter the ten paragraph marks.

Figure 2:
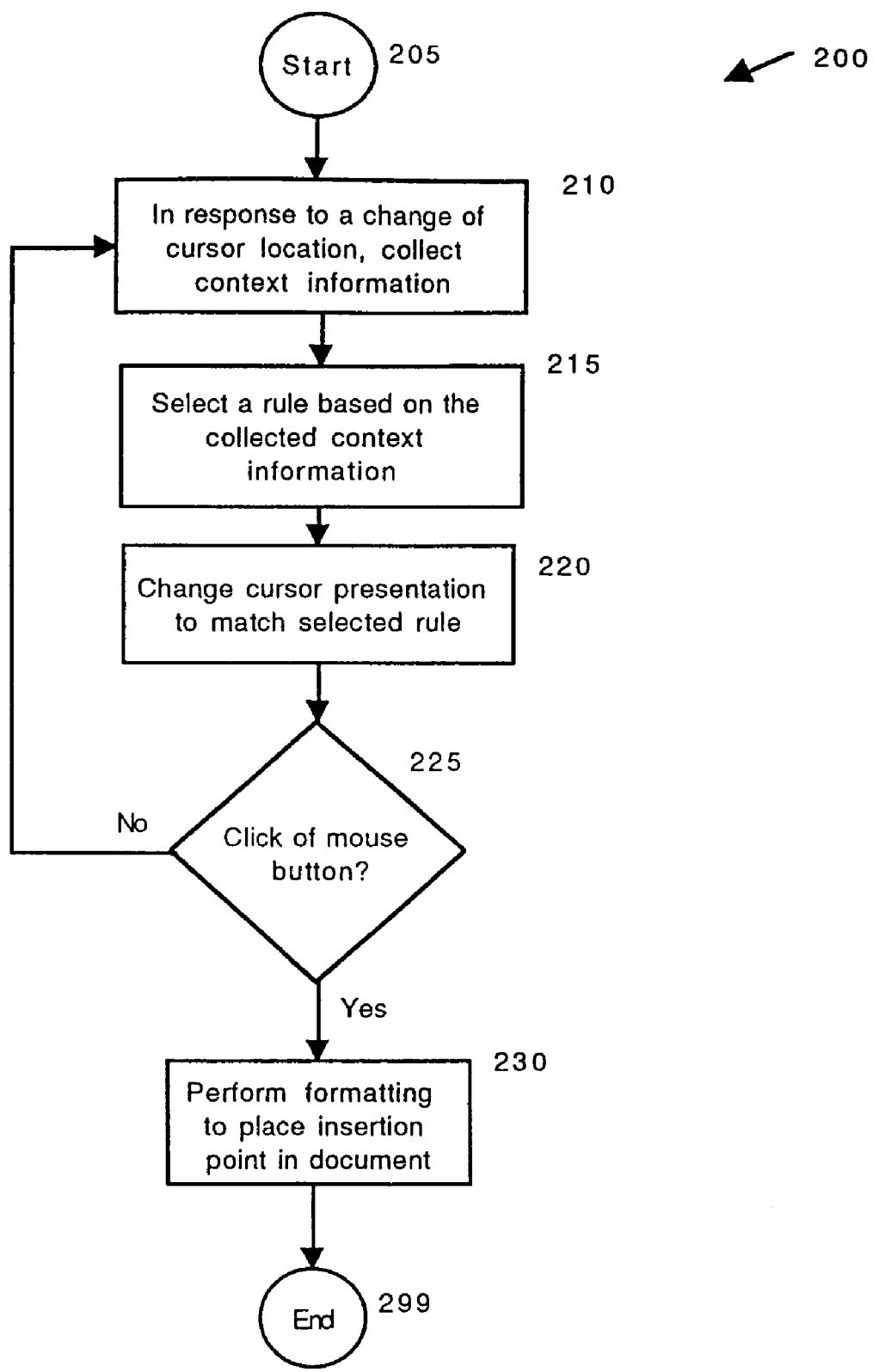
FIG. 2 is a flowchart illustrating a method for placing an insertion point in an electronic document in accordance with an exemplary embodiment of the present invention.

FIG. 2 is a flow chart illustrating a method 200 for placing an insertion point in an electronic document in accordance with an exemplary embodiment of the present invention. Those skilled in the art will appreciate that this exemplary embodiment is a computer-implemented process that is carried out by the computer in response to input from the user and instructions provided by a program module.

Referring to FIG. 2, the method 200 begins at start step 205 and proceeds to step 210. At step 210, context information is collected in response to a change of cursor location. It should be understood that a cursor, or pointer, is typically used in the exemplary word processor program module to indicate the location that an insertion point will be placed if the user double-clicks the mouse button. The cursor is typically moved within a document by moving the mouse 42.

It should be understood that collecting context information is typically based on cursor position and comprises determining which paragraph the cursor is over. For example, typically, the cursor may be over existing text (including blank lines) or the cursor may be over no existing text. If the cursor is over existing text, then there are properties, or attributes, of the existing text that are examined. These properties include, but are not limited to, tab stops, section level properties (a section is typically defined by section breaks), and paragraph properties (a paragraph is text between two paragraph marks). If the cursor is over no existing text, then the closest text that is immediately above the cursor position is examined and properties, or attributes, of that text are examined.

In other embodiments, the collection of context information may comprise examining the alignment of the line over which the cursor is positioned, examining whether there is text on the line over which the cursor is positioned, examining whether tab stops exist on the line over which the cursor is positioned, determining the horizontal position of the cursor on the line, determining the vertical position of the cursor in the document, determining the formatting of text above the cursor location, and determining the formatting of text below the cursor location, just to name a few.

Table 1 is a list of the attributes, or context information, that are typically collected and examined at step 210 in an exemplary embodiment of the present invention. Table 1 includes an attribute number, an attribute name, and a brief description of each attribute. These attributes will be briefly described below Table 1. These attributes may be used by rule triggers, as described below, to determine where to position an insertion point in the document. In this detailed description, EOD will be used to refer to the end of a document, EOP will be used to refer to the end of a paragraph and IP will be used to refer to insertion point.

TABLE 1

Attribute List

| No. | Name | Description |
|---|---|---|
| 1 | IP Position | 1) At EOP of same line<br>2) EOD<br>3) Somewhere else |
| 2 | EODDist | Number of lines between EOD and line over which the cursor is positioned. |
| 3 | TopDist | Number of lines from Top line of page. |
| 4 | EOPDist | Number of average size characters between current cursor location and EOP on the same line. |
| 5 | TextExists | Text present on the Line over which the cursor is positioned. |
| 6 | EODExists | EOD present on the Line over which the cursor is positioned. |
| 7 | LMDist | Distance from left margin. |
| 8 | LPBDist | Distance from left page boundary. |
| 9 | RMDist | Distance from right page margin. |
| 10 | RPBDist | Distance from right page boundary. |
| 11 | TMDist | Distance from top page margin. |
| 12 | TPBDist | Distance from top page boundary. |
| 13 | BMDist | Distance from bottom page margin. |
| 14 | BPBDist | Distance from bottom page boundary. |

TABLE 1-continued

Attribute List

| No. | Name | Description |
|---|---|---|
| 15 | PageDist | Number of pages between EOD and Floating IP. |
| 16 | TextSize | Number of characters being dragged. |
| 17 | LineAlign | Alignment of current line of text |
| 18 | LastAlign | Alignment of last existing line of text. |
| 19 | ColumnInfo | Some information on columns to allow. Disable if columns exist. |
| 20 | TableSize | Actual measurements of table. |
| 21 | Tabs | Number and types of tab on line. Also information regarding whether they are governed by default or set stop tabs. |
| 22 | LastTabs | Number and types of tab stops on last line. |
| 23 | Table | Determination whether insertion point is in a table. |
| 24 | VertCellPosition | How far from the top of the cell is the IP in percentage? (i.e., 0 is at the top, 100 is at the bottom) |
| 25 | CellSize | How big is the cell? This is needed for Zone calculation. |
| 26 | ParaTabsStops | Number and location of tab stops in the paragraph. Also, for each one, a Boolean value is stored indicating whether the stop is being used in the paragraph. |
| 27 | LastParaTabsStops | Number and location of tab stops in the paragraph. Also, for each one, a Boolean value is stored indicating whether the stop is being used in the paragraph. |
| 28 | PageBreak | Number of lines below a page break on the current page. |
| 29 | TableonSide | Is there a table to the left or right of the double-click area? What are the dimensions, and where vertically is this double-click, as measured against the object in percentage. |
| 30 | View | What view is the user in? (Normal/Page View v. Online) |
| 31 | Primary Language | What is the primary language version setting. |
| 32 | LinesSelected | The number of entire lines selected. |

Attribute 1 is insertion point position, or IP position. The IP position may be either: at the end of the paragraph (EOP) of the same line over which the cursor is positioned, at the end of the document (EOD), or somewhere else within the document.

Attribute 2 is the distance to the end of the document, or EODDist. The distance to the end of the document is the number of lines between the end of the document (EOD) and the floating insertion point, or floating IP. The floating IP may also be described as the line over which the cursor is positioned.

Attribute 3 is the distance to the top of the page, or TopDist. The TopDist is the number of lines from the top line of the page to the cursor location.

Attribute 4 is the distance to the end of the page, or EOPDist. The distance to the end of the page is typically the number of average size characters between current cursor location and the end of the paragraph on the same line.

Attribute 5 is TextExists and is an indication of whether or not text exists in the line over which the cursor is positioned.

Attribute 6 is EODExists and is an indication of whether or not the end of the document (marker) is present on the line over which the cursor is positioned.

Attribute 7 is LMDist and is the distance from the left margin of the document to the cursor location.

Attribute 8 is LPBDist and is the distance from the left page boundary to the cursor location.

Attribute 9 is RMDist and is the distance from the right margin of the document to the cursor location.

Attribute 10 is RPBDist and is the distance from the right page boundary to the cursor location.

Attribute 11 is TMDist and is the distance from the top page margin of the document to the cursor location.

Attribute 12 is TPBDist and is the distance from the top page boundary to the cursor location.

Attribute 13 is BMDist and is the distance from the bottom page margin of the document to the cursor location.

Attribute 14 is BPBDist and is the distance from the bottom page boundary to the cursor location.

Attribute 15 is PageDist and is the number of pages between the end of the document and the floating IP.

Attribute 16 is TextSize and is equal to the number of characters being dragged.

Attribute 17 is LineAlign and is the alignment of the current line of text over which the cursor is positioned.

Attribute 18 is LastAlign and is the alignment of the last existing line of text in the document.

Attribute 19 is ColumnInfo and is information on the columns to allow, such as how many columns are in the section over which the cursor is currently positioned.

Attribute 20 is TableSize and is the measurement of the table and its constituent cells. Thus, if a table cell is too narrow, no right or center alignment is allowed.

Attribute 21 is Tabs and is typically the number and type of tab stops on the line over which the cursor is positioned.

Attribute 22 is LastTabs and is typically the number and type of tab stops of the last line in the document.

Attribute 23 is Table and is an indication of whether the location of the cursor is currently within a table.

Attribute 24 is VertCellPosition and is an indication of how far from the top of the cell the insertion point is in percentage terms. For example, a zero typically indicates that the insertion point is at the top of the document and a 100 indicates that the insertion point is at the bottom of the document.

Attribute 25 is CellSize and corresponds to the size of the cell.

Attribute 26 is ParaTabStops and indicates the number and location of tab stops in the paragraph over which the cursor is currently positioned.

Attribute 27 is LastParaTabsStops and indicates the number and location of tab stops in the paragraph immediately preceeding the location of the cursor in the document.

Attribute 28 is PageBreak and indicates the number of lines below a page break that are on the current page.

Attribute 29 is an indication of whether there is a table on the left or right of the cursor location.

Attribute 30 is View and is an indication of whether the view is normal, web, page layout or online.

Attribute 31 is INTL DLL and is the international language that is default for the word processor program module.

Attribute 32 is LinesSelected and is the number of entire lines currently selected.

Returning now to FIG. 2, after the context information is collected at step 210, the method proceeds to step 215 where a rule is selected based upon the collected context information. It should be understood that typically a database of rules is maintained by the word processor program module 37a. Each rule will generally have an associated trigger that indicates that the rule is to be applied to alter the formatting of the electronic document. The trigger will typically be a specific set of attributes, or context information, that indicates that the rule is appropriate to apply. Thus, when a specific set of context information is collected at step 210, a specific rule will be selected at step 215.

The rules database that is applied in an exemplary embodiment of the present invention is described below in reference to Table 2. Table 2 includes a rule number column, a rule name column, a rule trigger column, and a formatting column.

For Table 2 below, the following definitions apply: PageBreakDist is the number of lines between the last page break and the current location of the cursor; zones are conditions in which the user probably wants alignment of the document changed (for example, the center zone is 0.5 inches to the left or right of the midpoint between the right and left margins on the current line); a soft return is typically a depression of the Shift key or Enter key which doesn't create a new paragraph, but does create a new line break;

TABLE 2

Rule List

| No. | Rule | Trigger | Formatting |
|---|---|---|---|
| 1 | New Page Click | PageDist = 1 AND EODDist > 2 | Insert a page break and Insert TopDist number of EOP marks. |
| 2 | Click below a page break | PageBreakDist = −1 (not on same page as EOD). | Insert PageBreak number of EOPs before the page break AND position cursor before the page break. |
| 3 | Click below a page break | ColumnBreakDist = −1 | Insert ColumnBreakDist number of EOPs before the page break and position cursor before the page break. |
| 4 | Below EOD insertion on same page. | EODDist > 1 | Insert EODDist number of EOP marks between EOD and Floating IP. |
| 5 | Click on a line directly under the EOD | LastAlign = Right AND TextExists = NO AND LMDist < LeftAlignThreshold | Insert EOP in previous line style and Left Align line. |
| 6 | Insertion Point Placed at Head of Empty Right/Center Aligned Line | LineAlign = Left AND TextExists = No AND IP in Left Zone | Left Align line |
| 7 | Insertion Point Placed in middle of Empty Right/Center Aligned Line | LineAlign = Left AND TextExists = No AND IP not in any zone | Left Align line and insert left tab stop at IP and insert tab character before cursor. |
| 8 | Insertion at head of right aligned line with text | Line Align = Left AND TextExists = Yes AND IP in Left Zone. | Left Align Line and insert a right aligned tab stop at the right margin and insert tab character before existing text. |

TABLE 2-continued

Rule List

| No. | Rule | Trigger | Formatting |
|---|---|---|---|
| 9 | Insertion somewhere within right aligned line with text | Line Align = Left AND TextExists = Yes AND IP not in any Zone. | Left Align Line and insert a right aligned tab stop at the right margin and insert tab character before existing text and insert tab character before IP. |
| 10 | Insertion at Head of Center Aligned Line with Text | Line Align = Center AND TextExists = Yes AND IP in Left Zone. | Left Align Line and insert a right aligned tab stop at the right margin (or a center tab if centered aligned) and insert tab character before existing text and position IP at beginning of line. |
| 11 | Insertion at Right Side of Center Aligned Line with Text | TextExists = Yes AND Line Align = Center AND cursor is after all text on line. | Left align line and add center tab stop at mid indent point and add tab character before existing text and add tab character after existing text and add left tab at click location. |
| 12 | Insertion at right side of left aligned line with text | TextExists = Yes AND Line Align = Left. | Add left tab stop at location and add tab character before IP. |
| 13 | Insertion at right zone of left aligned line with text | TextExists = Yes AND Line Align = Left AND IP is after all text on line AND paragraph doesn't continue on next line OR soft return exists to the left of the cursor. | Add tab character after existing text and add a right tab stop at right margin. |
| 14 | Insertion on either side of center aligned line with text | TextExists = Yes AND LineAlign = Center AND IP is on this line, but not in right or left align zones. | Add a left tab stop at click location and add tab character before the IP. |
| 15 | Insertion on either side of center aligned line without text | TextExists = No AND LineAlign = Center AND IP is on this line, but not in right or left align zones. | Add a left tab stop at click location and add tab character before the IP and change alignment to left. |
| 16 | Insertion in center of right aligned line with text. | Line Align = Right AND IP in center zone. Note: Should happen for text and no text lines. | Left align line and insert a center aligned tab stop in the center position and insert tab character before IP and insert tab character after IP. |
| 17 | Insert at right side of center aligned line without text. | LineAlign = Center and TextExists = No and IP in right zone. | Right align line. |
| 18 | Right zone on blank line | LineAlign = Right AND TextExists = No AND Zone = Right Indent. | Show right zone cursor and right align line. |
| 19 | Classic Indent | TextExists = No and Zone = Left Indent. | Add first line indent at DEFAULT INDENT POSITION. |
| 20 | Insertion after all text on left aligned line. | Line Align = Left AND IP is after any and all text (on that line). | Insert left tab stop at IP location and insert tab character before the IP. |
| 21 | Click under tab | TextExists = No AND LastParaTabStops = (One is being used) AND LMDist is within TabSnap Threshold of a tab stop in use. | Insert a left aligned tab stop at the same position as above tab stop and insert tab character before IP. |
| 22 | Left of left tab on left aligned line | TextExists = YES AND LineAlign = Left, left tab stop exists and IP is to the left of the left tab stop. | Insert left tab stop at IP and insert tab character after IP. |
| 23 | Head of line with left aligned tab | TextExists = YES AND Left Tab Stop Exists AND IP is to the left of the left tab stop. | Insert IP before tab character. |
| 24 | In between left and right tabs. Note: This is a redundant rule. | Text Exists = YES AND LineAlign = Left AND Tab Stops Exist to left and right of IP. | Insert left tab stop at IP; Insert left tab character before IP. |
| 25 | In between left and right tabs in center zone | Text Exists = YES AND LineAlign = Left AND Tab Stops Exist to left and right of IP and IP center zone. | Insert center tab stop at midpoint of indents and insert tab character before in IP. |
| 26 | Center zone on left aligned line with text | Text Exists = YES AND LineAlign = Left AND IP in center zone | Insert center tab stop at midpoint of indents and insert tab character before IP. |
| 27 | To the right of an inline graphic | Single graphic exists to the left of the IP AND no text is to the left of the table or graphic. | Change graphic to floating; turn text wrap on right side only (show generic text cursor); insert "clear all" HTML break after IP. First click should not insert any indents/tabs or EOPs; 2nd click should not insert any indents/tabs (only EOPs); 3rd click should insert tabs/indents as appropriate. |
| 28 | To the left of the an inline graphic | Single graphic exists to the right of the IP AND no text is to the right of the table or graphic. | Change graphic to floating; turn text wrap on left side only (show generic text cursor); insert "clear all" HTML break after IP. First click should not insert any indents/tabs or EOPs; 2nd click should not insert any indents/tabs (only EOPs); 3rd click should insert tabs/indents as appropriate. |

TABLE 2-continued

Rule List

| No. | Rule | Trigger | Formatting |
|---|---|---|---|
| 29 | To the right of a table with no wrap | Single table exists to the left of the IP AND Table Text Wrap is off. | Turn Table text wrap on with "Left Side Wrap" option; insert "Clear All" HTML Break after IP; first click should not insert any indents/tabs or EOPs; second click should not insert any indents/tabs (only EOPs); 3rd click should insert tabs/indents as appropriate. |
| 30 | To the right of a table with Left Wrap | Single table exists to the left of the IP AND Table Text Wrap is set to "left side"; Table Text Wrap is off. | Turn Table text wrap on with "Left and Right" option; insert "Clear All" HTML Break after IP; first click should not insert any indents/tabs or EOPs; second click should not insert any indents/tabs (only EOPs); 3rd click should insert tabs/indents as appropriate. |
| 31 | To the left of a table with no wrap | Single table exists to the right of the IP AND table text wrap is off. | Turn Table text wrap on with "Right Side Wrap" option; insert "Clear All" HTML Break after IP; first click should not insert any indents/tabs or EOPs; second click should not insert any indents/tabs (only EOPs); 3rd click should insert tabs/indents as appropriate. |
| 32 | To the left of a table with right wrap | Single table exists to the right of the IP AND Table Text Wrap is set to "right side"; table text wrap is off. | Turn Table text wrap on with "Left and Right" option; insert "Clear All" HTML Break after IP; first click should not insert any indents/tabs or EOPs; second click should not insert any indents/tabs (only EOPs); 3rd click should insert tabs/indents as appropriate. |
| 33 | In Table Cell Past EOC | In Table Cell, EOCDist > 1 | Enter EOCDist number of EOP marks. |
| 34 | In Table Cell on one past EOC line | In Table Cell, EOCDist = 1. | Enter EOP IN PREVIOUS LINE STYLE. |
| 35 | In Table Cell Center Align | In Table Cell, Zone = center. | Center Align. |
| 36 | In Table Cell Left Align | In Table Cell, Zone = left. | Left Align. |
| 37 | On a line existing tab stops | Tab stops exist to the right of the end of the text. | Delete all tab stops to the right of the text; apply other click and type rules as if there were no tab stops existing; Note: if it is a blank line, delete all tab stops. |
| 38 | Show Right zone cursor on left justified lines (including blank ones). | IP line is left aligned even if there is no text; cursor is in the right zone. | Display right zone cursor. |
| 39 | | Click and type rule will add a tab stop | Convert existing default tab stops in use to left tab stops. |

Returning now to FIG. 2, after a rule is selected at step 215, the method 200 proceeds to step 220 and the cursor presentation is changed to match the selected rule. Typically, the cursor presentation will be an icon indicating the anticipated location of the insertion point should the user double-click the mouse button while the cursor is at its current location. In an exemplary embodiment, the cursor may be a left alignment icon indicating the insertion point will be left aligned, a center alignment icon indicating the insertion point will be center aligned, a right alignment icon indicating the insertion point will be right aligned, an indent icon indicating that the insertion point will be indented, and a text-wrapping icon indicating the type of text wrapping which will be applied to the object next to which the cursor is positioned Thus, a selected rule that corresponds to formatting steps that left align the insertion point will cause a left align cursor to be displayed.

Returning now to FIG. 2, after the cursor presentation is changed at step 220, the method proceeds to decision step 225. At decision step 225, a determination is made whether there is an indication to insert the insertion point into the document, such as by double-clicking the mouse button. If not, then the method returns to step 210. However, if there is a mouse double-click, then the method proceeds to step 230.

At step 230, formatting is performed to place the insertion point in the document. The formatting is typically based upon the rule which was selected at step 215. The formatting steps of an exemplary embodiment are described above in the fourth column of Table 2. After the formatting steps for the selected rule are performed at step 230 to place the insertion point in the document at step 230, the method 200 ends at step 299.

Figure 3:
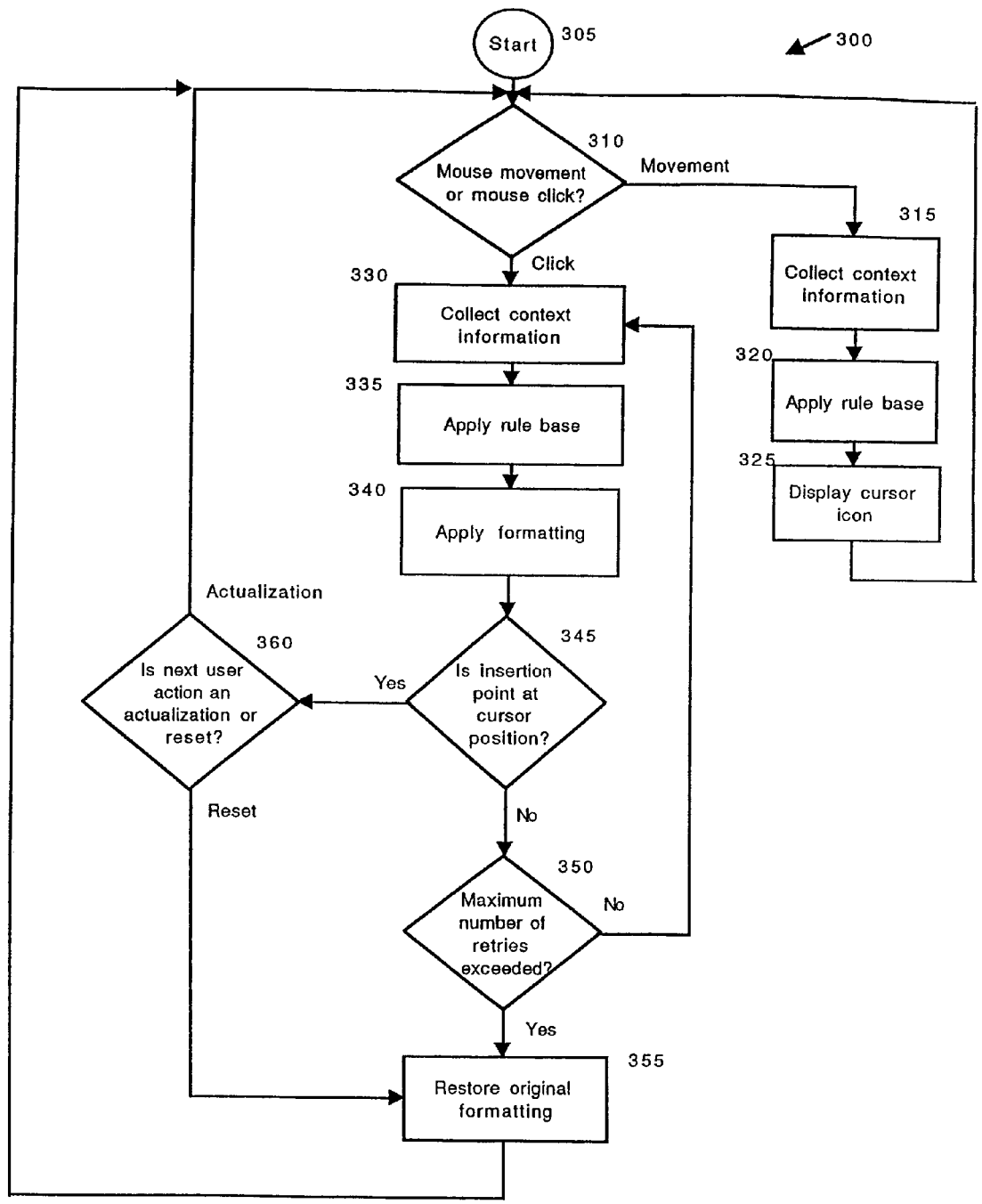
FIG. 3 is a flowchart illustrating a method for placing an insertion point in an electronic document and displaying a cursor in accordance with an exemplary embodiment of the present invention.

Referring now to FIG. 3, a flowchart illustrating a method 300 for placing an insertion point in an electronic document and displaying a cursor in accordance with an exemplary embodiment of the present invention will be described. The method 300 begins at start step 305 and proceeds to decision step 310.

At decision step 310, it is determined whether there is some type of a mouse movement or mouse double-click, or depression. If there is a mouse movement, then the method 300 proceeds to step 315. If there is a mouse double-click, then the method proceeds to step 330.

At step 315, context information regarding the location of the cursor in the document is collected. In an exemplary embodiment, information such as the information described in Table 1 is collected at step 315. The method then proceeds to step 320.

At step 320, the collected context information is applied to a database of rules to determine if the collected context information applies to one of the rules. Typically, this is accomplished by determining whether the collected context information matches a trigger for a rule, such as the triggers listed above in the third column of Table 2. Typically, the rules are ordered and the first rule to match is the one used. The method then proceeds to step 325.

At step 325, an appropriate cursor is displayed. Typically, the cursor is determined by the rule which was found at step 320. In other words, each rule will have an appropriate cursor. For example, if it is determined at step 320 that the collected context information matches the trigger for rule number 1, then the cursor associated with rule number 1 is displayed at step 325. The method then returns to decision step 310 from step 325. The cursor is typically used to provide the user with an indication of the placement of the insertion point should the user choose to enter an insertion point with the cursor in its current location. Thus, as the cursor is moved around the screen, the cursor will change based upon the changing context information.

If, at decision step 310, it is determined that there is a mouse double-click, then the method 300 proceeds to step 330. Context information regarding the location of the cursor, such as the attributes described in reference to Table 1, are collected at step 330. The method 300 then proceeds to step 335.

At step 335, the collected context information from step 330 is applied to a database of rules to determine if the collected context information applies to one of the rules. Typically, this is accomplished by determining whether the collected context information matches a trigger for a rule, such as the triggers listed in the third column of Table 2. The method then proceeds to step 340.

At step 340, formatting is performed to place the insertion point in the document. The formatting is typically based upon the rule which was selected at step 335. The formatting steps for specific rules of an exemplary embodiment are described above in the fourth column of Table 2. After the formatting steps are performed at step 340, the method 300 then proceeds to decision step 345.

At decision step 345, it is determined whether the current location of the insertion point is at the location of the cursor at the time the mouse button was double-clicked. It should be understood that method 300 is iterative and it may require the application of several rules and formatting steps before the insertion point is located at the cursor location. If, at decision step 345, it is determined that the insertion point is not at the cursor location at the time the mouse button was depressed, then the method proceeds to decision step 350. However, if, at decision step 345, it is determined that the insertion point is at the cursor location, then the method 300 proceeds to decision step 360.

At decision step 350, it is determined whether a maximum number of retries has been exceeded. If so, then the method proceeds to step 355. However, if a maximum number of retries has not been exceeded, then the method returns to step 330 and context information is collected based upon the adjusted position of the insertion point. The maximum number of retries is the number of iterations that will be made to place the insertion point at the cursor location.

At step 355, the original formatting of the document is restored. It should be understood that the original formatting refers to the formatting of the document before the mouse button was depressed at decision step 310. The method then proceeds from step 355 and returns to decision step 310.

At decision step 360, it is determined whether the next user action is an actualization or reset action. In an exemplary embodiment, an actualization is an indication that the user wants to enter elements into the electronic document at the insertion point. For example, an actualization may be typing text into the electronic document using the keyboard or changing font attributes. An actualization may also be an amount of time that elapses such that it is understood that the user actually does wish to place the insertion point at the new location.

A reset action is an indication that the user does not want any added formatting (added at step 340) to be saved and wants the original formatting restored. For example, a reset action may be a double-click of the mouse button in another part of the electronic document before entering any elements into the document and before any actualization time limit has elapsed.

If, at decision step 360, it is determined that the next action is an actualization, then the method returns to decision step 310 and the formatting added at step 340 is maintained. However, if, at decision step 360, it is determined that the next action is a reset action, then the method proceeds to step 355 and the original formatting of the document is restored.

Figure 4A:
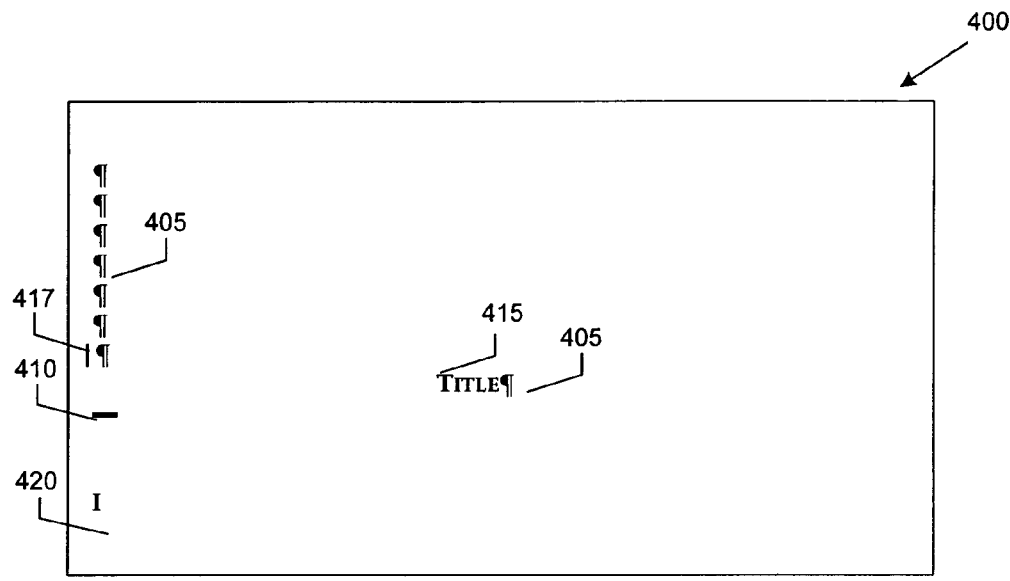
FIGS. 4A and 4B are illustrations of a method for placing an insertion point in an electronic document in accordance with an exemplary embodiment of the present invention.
Figure 4B:
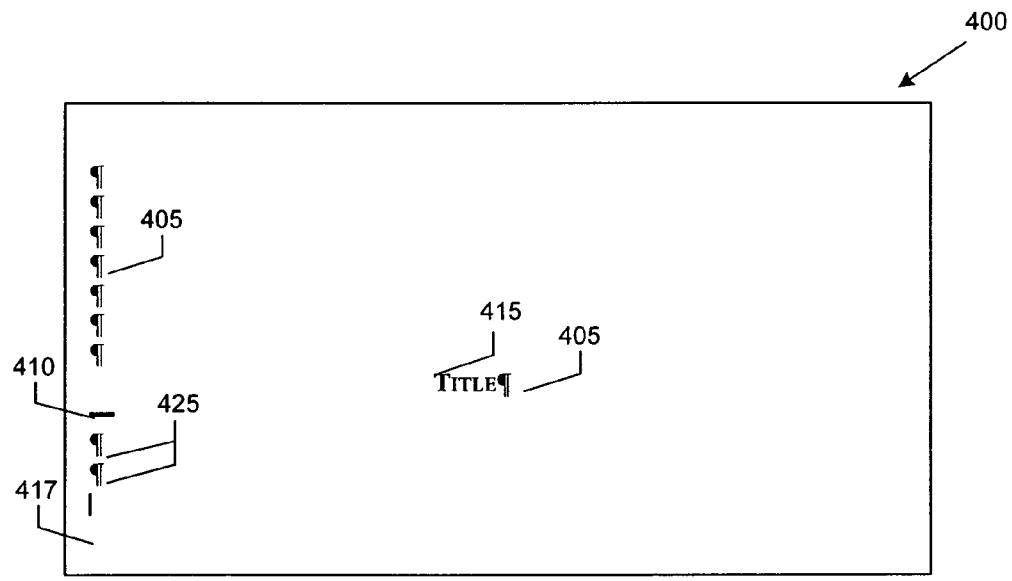

To demonstrate method 300, an example is provided in reference to FIGS. 4A and 4B. Referring now to FIG. 4A, an electronic document 400, paragraph marks 405, and end of document (EOD) marker 410, a title 415, an insertion point 417 and a cursor 420 are illustrated.

Referring now to FIGS. 3, 4A, and 4B, an example illustrating the method 300 will be described. The method 300 starts at start step 305 and proceeds to decision step 310.

At decision step 310, it is determined whether there is a mouse movement or mouse double-click, or depression. For purposes of this example, assume that the user double-clicks the mouse button with the cursor located as illustrated in FIG. 4A. The method proceeds to step 330.

Context information regarding the location of the cursor, such as the attributes described in reference to Table 1, are collected at step 330. The method 300 then proceeds to step 335.

At step 335, the collected context information from step 330 is applied to a database of rules to determine if the collected context information applies to one of the rules. Typically, this is accomplished by determining whether the collected context information matches a trigger for a rule, such as the triggers listed in the third column of Table 2. For this example, rule number 3 in Table 2 would apply because the collected context information matches the trigger for rule 3, i.e., that the number of lines between the end of document and the floating IP is greater than one. The number of lines between the end of document and the floating IP is also know as the EODDist. The method then proceeds to step 340.

At step 340, formatting is performed to place the insertion point in the document. The formatting is typically based upon the rule which was selected at step 335. The formatting steps for specific rules of an exemplary embodiment are described above in the fourth column of Table 2. For this example, the formatting steps associated with rule 3 is to insert EODDist number of paragraph marks between the EOD and the floating IP. After the formatting steps are performed at step 340, the method 300 then proceeds to decision step 345.

At decision step 345, it is determined whether the current location of the insertion point is at the location of the cursor at the time the mouse button was double-clicked. For this example, at decision step 345, it is determined that the insertion point is at the cursor location, so the method 300 proceeds to decision step 360.

At decision step 360, it is determined whether the next user action is an actualization or reset action. For this example, assume that the user action is an actualization, so the method returns to decision step 310 and the formatting added at step 340 is maintained. As shown in FIG. 4B, after method 300 is performed, insertion point 417 has been moved to the location at which cursor 420 (FIG. 4A) was double-clicked by the user. Paragraph marks 425 have been added based upon the formatting steps of rule 3 (Table 2).

From the foregoing description, it will be apparent to those skilled in the art that the present invention provides a method and system for placing an insertion point in an electronic document. The Click and Type feature is intuitive to use and saves the user time because paragraph marks and formatting constraints often do not have to be entered. The user may simply double-click (or click) at any point in an electronic document and begin typing.

It should be understood that, although the present invention has been described above as requiring a double-click of the mouse button before inserting an insertion point, any number of clicks, including a single click, may be implemented to insert the insertion point.

It should be understood that the present invention may also include a one-two click feature. In one embodiment, this one-two click feature will place the insertion point at the end of a paragraph or end of a document or flush against the left margin of the line over which the cursor is positioned on the first double click and the user will have to double click the mouse button a second time to place the insertion point at the exact location that the cursor is located. The one-two click feature provides continuity between the prior art and the present invention because the first action is the action many users expect based upon the prior art.

Moreover, if the one-two click model is used, then the user does not need to worry about being totally accurate in positioning the cursor, because on the first double click, it will be placed in the location that the user has a high probability of desiring. If that position is not the location that the user wants the cursor placed, another double click will move it to the exact location. For example, when clicking to the right of an inline table or image, the first double click will always place the cursor directly adjacent to the top right corner of the table or image.

Although the present invention has been described above as implemented in a word processing program module, it should be understood that the present invention may be implemented in other program modules, including, but not limited to, HTML authoring programs and presentation programs such as the "POWERPOINT" application program module, marketed by Microsoft Corporation of Redmond, Wash.

It should be further understood that the present invention could be used to drag text or an object to a certain location and then insert the dragged text or object along with the appropriate formatting necessary to allow the dragged object to be placed in the location to which it was dragged. The method of inserting a dragged object includes obtaining information about the text or object being dragged.

Although the present invention has been described above as implemented in the preferred application program module, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented method for placing an insertion point in an electronic document, the method comprising the steps of:
   (a) determining whether a location of a cursor in the electronic document is positioned over existing text;
   (b) collecting context information regarding the location of the cursor in the electronic document by:
      if the location of the cursor is positioned over existing text, then collecting context information associated with the existing text;
      if the location of the cursor is not positioned over existing text, collecting context information associated with the existing text that is proximate to the location of the cursor,
      wherein collecting context information comprises: examining an alignment of a line over which the cursor is positioned, examining whether there is text on the line over which the cursor is positioned, examining whether tab stops exist on the line over which the cursor is positioned, determining a horizontal position of the cursor on the line, determining a vertical position of the cursor in the document, determining the formatting of text above the cursor location when there is no text on the line over which the cursor is positioned, and determining the formatting of text below the cursor location when there is no text on the line over which the cursor is positioned and when there is no text above the cursor location;
   (c) determining whether the collected context information matches a trigger associated with a rule in a database of rules, wherein the rule is associated with formatting steps for placing the insertion point in the electronic document;
   (d) if the collected context information matches a trigger, changing a presentation of the cursor to indicate the type of formatting to be applied to text and objects inserted at the location of the cursor;
   (e) determining whether an indication has been received to place the insertion point in the electronic document; and
   (f) if an indication has been received, then performing formatting based on the formatting steps to place the insertion point in the electronic document at the location of the cursor.

2. The method recited in claim 1 wherein the step of determining whether an indication has been received to place the insertion point in the electronic document comprises determining whether a button on a mouse has been double-clicked.

3. The method recited in claim 1 further comprising the step of:
   if an indication has not been received to place the insertion point in the electronic document, then repeating steps (a)–(f).

4. The method recited in claim 1 wherein the step of performing formatting to place the insertion point in the electronic document comprises adding and deleting formatting properties from the electronic document.

5. The method recited in claim 1 wherein the step of determining whether a location of a cursor in the electronic document is positioned over existing text is preformed in response to a change in the location of the cursor.

6. A computer-readable medium having computer-executable instructions for performing the steps recited in claim 1.

7. The method recited in claim 1, wherein the indication comprises a first click and a second click and wherein the insertion point is placed at a first location in response to the first click and wherein the insertion point is placed at a second location in response to the second click.

8. The method recited in claim 1, further comprising receiving an actualization input.

9. A computer-implemented method for displaying a cursor in an electronic document, the method comprising the steps of:
   (a) determining whether a location of a cursor in the electronic document is positioned over existing text;
   (b) collecting context information regarding the location of the cursor by:
      if the location of the cursor is positioned over existing text, then collecting context information associated with the existing text;
      if the location of the cursor is not positioned over existing text, collecting context information associated with existing text that is proximate to the location of the cursor,
      wherein collecting context information comprises: examining an alignment of a the line over which the cursor is positioned, examining whether there is text on the line over which the cursor is positioned, examining whether tab stops exist on the line over which the cursor is positioned, determining a horizontal position of the cursor on the line, determining a vertical position of the cursor in the document, determining the formatting of text above the cursor location when there is no text on the line over which the cursor is positioned, and determining the formatting of text below the cursor location when there is no text on the line over which the cursor is positioned and when there is no text above the cursor location;
   (c) determining whether the collected context information matches a trigger corresponding to a rule in a database of rules, wherein the rule is associated with a cursor to be displayed;
   (d) if the collected context information matches a trigger, selecting the cursor associated with the rule that corresponds to the trigger, wherein the cursor indicates the type of formatting to be applied to text and objects inserted at the location of the cursor, and
   (e) displaying the selected cursor such that text and objects inserted at the location of the cursor are formatted based on the type of formatting indicated by the cursor.

10. The method recited in claim 9 wherein the selected cursor indicates the anticipated location of an insertion point in the electronic document.

11. The method recited in claim 9 further comprising the step of repeating steps (a)–(c) as the cursor is moved around the electronic document.

12. A computer-readable medium having computer-executable instructions for performing the steps recited in claim 11.

13. For an electronic system for creating and editing an electronic file, a method for adjusting the location of an insertion point in an electronic file to match the location of a cursor, the method comprising the steps of:
   (a) determining whether a location of a cursor in the electronic file is positioned over existing text;
   (b) collecting context information regarding a location of a cursor in the electronic file by:
      if the location of the cursor is positioned over existing text, then collecting context information associated with the extisting text;
      if the location of the cursor is not positioned over existing text collecting context information associated wit existing text that is proximate to the location of the cursor,
      wherein collecting context information comprises examining an alignment of a line over which the cursor is positioned, examining whether there is text on the line over which the cursor is positioned, examining whether tab stops exist on the line over which the cursor is positioned, determining a horizontal position of the cursor on the line, determining a the vertical position of the cursor in the document, determining the formatting of text above the cursor location when there is no text on the line over which the cursor is positioned, and determining the formatting of text below the cursor location when there is no text on the line over which the cursor is positioned and when there is no text above the cursor location;
   (c) determining whether the collected context information matches a trigger corresponding to a rule in a database of rules, wherein the rule is associated with formatting properties for adjusting the location of the insertion point in the electronic file;
   (d) if the collected context information matches a trigger, then adjusting the location of the insertion point to the location of the cursor based upon the formatting properties; and
   (e) displaying the cursor at the insertion point such that the cursor indicates the type of formatting to be applied to text objects inserted at the insertion point.

14. A computer-readable medium having computer-executable instructions for performing the steps recited in claim 13.

15. For an electronic system for creating and editing an electronic document, a method for placing an insertion point in the electronic document, the method comprising the steps of:
   (a) determining whether a location of a cursor in the electronic document is positioned over an existing line;
   (b) collecting context information regarding the location of the cursor in the electronic document by:
      if the location of the cursor is positioned over the existing line, then collecting context information associated with the existing line;
      if the location of the cursor is not positioned over the existing line, collecting context information associated with an existing line that is proximate to the location of the cursor,
      wherein collecting context information comprises: examining an alignment of a the line over which the cursor is positioned, examining whether there is text on the line over which the cursor is positioned, examining whether tab stops exist on the line over which the cursor is positioned, determining a horizontal position of the cursor on the line, determining a vertical position of the cursor in the document, determining the formatting of text above the cursor location when there is no text on the line over which the cursor is positioned, and determining the formatting of text below the cursor location when there is no text on the line over which the cursor is positioned and when there is no text above the cursor location;

(c) determining whether the collected context information matches a trigger corresponding to a rule in a database of rules, wherein the rule is associated with formatting steps for placing the insertion point in the electronic document;

(d) if the collected context information matches a trigger, changing a presentation of the cursor to indicate the type of formatting to be applied to text and objects inserted at the location of the cursor;

(e) determining whether an indication has been received to place the insertion point in the electronic document; and (f) if an indication has been received, then performing formatting based on the formatting steps to place the insertion point in the electronic document at the location of the cursor.

16. A computer-implemented method for editing an electronic document comprising:

displaying a cursor at a location in the electronic document, wherein the cursor indicates the type of formatting to be applied to text and objects inserted at the cursor location;

receiving a notification of an intent to create an insertion point at the cursor location;

if the cursor location corresponds to no existing text, collecting context information associated with existing text that is proximate to the cursor location, wherein collecting context information comprises: examining an alignment of a line over which the cursor is positioned, examining whether there is text on the line over which the cursor is positioned, examining whether tab stops exist on the line over which the cursor is positioned, determining a horizontal position of the cursor on the line, determining a vertical position of the cursor in the document, determining the formatting of text above the cursor location when there is no text on the line over which the cursor is positioned, and determining the formatting of text below the cursor location when there is no text on the line over which the cursor is positioned and when there is no text above the cursor location;

determining whether the collected context information matches a trigger, wherein the trigger is associated with formatting adjustments; and if the collected context information matches the trigger, automatically implementing the formatting adjustments to create the insertion point at the cursor location.

17. The computer-implemented method of claim 16, wherein the formatting adjustments comprise adding paragraph marks sufficient to extend existing text to a vertical location proximate to the cursor location.

18. The computer-implemented method of claim 17, wherein the formatting adjustments comprise characters, tabs, or spaces sufficient to extend existing text to a horizontal location proximate to the cursor location.

19. The computer-implemented method of claim 16, wherein the formatting adjustments comprise characters, tabs, or spaces sufficient to extend existing text to a horizontal location proximate to the cursor location.

20. The computer-implemented method of claim 16, wherein the no existing text corresponds to a location in a graphical representation of the electronic document at which no document content exists.

21. The computer-implemented method of claim 16, wherein the no existing text corresponds to a location in a graphical representation of the electronic document outside an end of document marker.

* * * * *

UNITED STATES PATENT AND TRADEMARK OFFICE
CERTIFICATE OF CORRECTION

PATENT NO. : 7,024,623 B2
APPLICATION NO. : 09/098366
DATED : April 4, 2006
INVENTOR(S) : Higashiyama et al.

It is certified that error appears in the above-identified patent and that said Letters Patent is hereby corrected as shown below:

On the title page, in Item (56), under "Other Publications", in column 2, line 3, delete "pp.525-530." and insert -- pp. 525-530. --, therefor.

In column 1, line 14, delete "modem" and insert -- modern --, therefor.

In column 4, line 56, delete "Jusitified" and insert -- Justified --, therefor.

In column 4, line 57–60, delete
"6. type the author's name and date. However, using the Click and Type feature, the same title page may be created without having to hit the Enter key and without having to manually set the justification. Thus, the steps would be:" and insert
-- 6. type the author's name and date.
However, using the Click and Type feature, the same
title page may be created without having to hit the Enter key and without having to manually set the justification. Thus, the steps would be: --, therefor.

In column 4, line 63, delete "page:" and insert -- page; --, therefor.

In column 9, line 53, delete "proceeding" and insert -- preceding --, therefor.

In column 10, line 26, delete "break;" and insert -- break. --, therefor.

In column 18, line 22, in Claim 1, after "with" delete "the".

In column 19, line 3, in Claim 5, delete "preformed" and insert -- performed --, therefor.

In column 19, line 29, in Claim 9, after "alignment of a" delete "the".

In column 19, line 50, in Claim 9, delete "cursor," and insert -- cursor; --, therefor.

Signed and Sealed this

Eighteenth Day of May, 2010

David J. Kappos
*Director of the United States Patent and Trademark Office*

CERTIFICATE OF CORRECTION (continued)
U.S. Pat. No. 7,024,623 B2

In column 19, line 59, in Claim 11, delete "steps (a)–(c)" and insert -- steps (a)–(e) --, therefor.

In column 19, line 64–67, in Claim 13, delete "For an electronic system for creating and editing an electronic file, a method for adjusting the location of an insertion point in an electronic file to match the location of a cursor, the method comprising the steps of:" and insert -- A computer-implemented method for adjusting the location of an insertion point in an electronic file to match the location of a cursor, the method comprising the steps of: --, therefor.

In column 20, line 7, in Claim 13, delete "extisting" and insert -- existing --, therefor.

In column 20, line 9, in Claim 13, delete "text" and insert -- text, --, therefor.

In column 20, line 10, in Claim 13, delete "wit" and insert -- with --, therefor.

In column 20, line 12, in Claim 13, delete "comprises" and insert -- comprises: --, therefor.

In column 20, line 41–44, in Claim 15, delete "For an electronic system for creating and editing an electronic document, a method for placing an insertion point in the electronic document, the method comprising the steps of:" and insert -- A computer-implemented method for placing an insertion point in an electronic document, the method comprising the steps of: --, therefor.

In column 20, line 57, in Claim 15, after "alignment of a" delete "the".